(12) United States Patent
DiBenedetto

(10) Patent No.: US 11,739,661 B2
(45) Date of Patent: *Aug. 29, 2023

(54) SEAL AIR BUFFER AND OIL SCUPPER SYSTEM AND METHOD

(71) Applicant: Raytheon Technologies Corporation, Farmington, CT (US)

(72) Inventor: Enzo DiBenedetto, Berlin, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/887,864

(22) Filed: Aug. 15, 2022

(65) Prior Publication Data

US 2022/0412227 A1 Dec. 29, 2022

Related U.S. Application Data

(63) Continuation of application No. 17/085,153, filed on Oct. 30, 2020, now Pat. No. 11,459,911.

(51) Int. Cl.
| | |
|---|---|
| *F01D 25/18* | (2006.01) |
| *F01D 9/06* | (2006.01) |
| *F02C 7/06* | (2006.01) |
| *F02C 7/28* | (2006.01) |
| *F01D 25/16* | (2006.01) |

(52) U.S. Cl.
CPC ............ *F01D 25/183* (2013.01); *F01D 9/065* (2013.01); *F02C 7/06* (2013.01); *F02C 7/28* (2013.01); *F01D 25/162* (2013.01); *F05D 2220/323* (2013.01); *F05D 2240/12* (2013.01); *F05D 2240/50* (2013.01); *F05D 2240/55* (2013.01); *F05D 2260/6022* (2013.01); *F05D 2300/224* (2013.01)

(58) Field of Classification Search
CPC .......... F01D 25/183; F01D 9/065; F02C 7/06; F02C 7/28; F05D 2240/55; F05D 2260/6022
See application file for complete search history.

(56) References Cited

U.S. PATENT DOCUMENTS

| | | |
|---|---|---|
| 2,791,090 A | 5/1957 | Hooker |
| 3,528,241 A | 9/1970 | Venable et al. |
| 4,245,951 A | 1/1981 | Minnich |
| 5,080,555 A | 1/1992 | Kempinger |
| 5,167,484 A | 12/1992 | Ponziani et al. |
| 6,102,577 A | 8/2000 | Tremaine |
| 6,565,095 B2 | 5/2003 | Meacham |

(Continued)

OTHER PUBLICATIONS

European Search Report dated Mar. 23, 2022 for European Patent Application No. 21205799.6.
U.S. Office Action dated Dec. 22, 2021 for U.S. Appl. No. 17/085,153.

*Primary Examiner* — Topaz L. Elliott
(74) *Attorney, Agent, or Firm* — Bachman & LaPointe, P.C.

(57) ABSTRACT

A turbine engine strut stage extends through a gaspath upstream of a guide vane stage. A carbon seal system seals a bearing compartment and has: a carbon seal mounted to the case and a seal runner on the spool; and a seal carrier carrying the carbon seal. The engine passes buffer air along a buffer air supply path internally through one or more first struts of the stage of struts. The engine drains oil along an oil drain path internally through one or more second struts of the stage of struts.

21 Claims, 8 Drawing Sheets

(56) References Cited

U.S. PATENT DOCUMENTS

| | | |
|---|---|---|
| 7,278,516 B2 | 10/2007 | Zalewski et al. |
| 7,435,052 B2 | 10/2008 | Spencer et al. |
| 7,967,560 B2 | 6/2011 | DiBenedetto |
| 9,765,645 B2 | 9/2017 | Fontanel et al. |
| 10,100,730 B2 | 10/2018 | Huppe et al. |
| 11,098,599 B2 | 8/2021 | Ramm |
| 2003/0099538 A1 | 5/2003 | Liu |
| 2005/0199445 A1 | 9/2005 | Zalewski et al. |
| 2014/0144121 A1 | 5/2014 | Legare et al. |
| 2014/0144154 A1 | 5/2014 | Legare et al. |
| 2017/0343111 A1 | 11/2017 | Ottow |
| 2018/0195416 A1 | 7/2018 | Jouy et al. |
| 2019/0178095 A1 | 6/2019 | Ramm |

SEAL AIR BUFFER AND OIL SCUPPER SYSTEM AND METHOD

CROSS-REFERENCE TO RELATED APPLICATION

This is a continuation of U.S. patent application Ser. No. 17/085,153, filed Oct. 30, 2020, and entitled "Seal Air Buffer and Oil Scupper System and Method".

BACKGROUND

The disclosure relates to gas turbine engines. More particularly, the disclosure relates to buffering of carbon seals.

Gas turbine engines (used in propulsion and power applications and broadly inclusive of turbojets, turboprops, turbofans, turboshafts, industrial gas turbines, and the like) often include carbon seal systems isolating oil-containing bearing compartments.

In many situations, bleed air is used to buffer the seals to counter oil infiltration. A typical buffering air supply is introduced through the adjacent engine shaft (e.g., entering an inter-shaft annulus and then passing back radially outward through the shaft for buffering. U.S. Pat. No. 7,435,052 of Spencer, Oct. 14, 2008, "Shaft oil purge system" discloses an oil purge. Various such purges risk oil contamination of the gaspath, thereby contaminating bleed air used for other purposes. U.S. Pat. No. 7,967,560 of DiBenedetto, Jun. 28, 2011, "Radially Energized Oil Capture Device for a Geared Turbofan" discloses an oil purge via buffer flow introduced through a low pressure spool shaft. The oil is collected via a scupper system. The particular illustrated implementation is at the aft/downstream end of the low pressure turbine (LPT).

SUMMARY

One aspect of the disclosure involves a turbine engine comprising: a case; and a gaspath through a compressor section, a combustor, and a turbine section. A spool has blade stages of at least one of the compressor section and the turbine section. A strut stage extends through the gaspath. A bearing supports a shaft of the spool for rotation relative to the case and is in a bearing compartment. A carbon seal system seals the bearing compartment and has: a carbon seal mounted to the case and a seal runner on the spool. An outwardly open channel is in the shaft. An annular cover is over the channel to form a shaft plenum and has: a plurality of first holes; and a plurality of second holes. The carbon seal system separates the bearing compartment from a first plenum, the plurality of first holes open to the first plenum. The plurality of second holes are open to a second plenum. A buffer air supply path internally through one or more first struts of the stage of struts passes through a third plenum, a plurality of third holes, the second plenum, the plurality of second holes, the shaft plenum, and the plurality of first holes, to the first plenum.

An oil drain path passes internally through one or more second struts of the stage of struts from the first plenum via one or more fourth holes.

In a further embodiment of any of the foregoing embodiments, additionally and/or alternatively, the buffer air supply path has a trunk and an annular plenum fed by the trunk and the oil drain path has a trunk.

In a further embodiment of any of the foregoing embodiments, additionally and/or alternatively, a guide vane stage extends through the gaspath downstream of the strut stage and upstream of an upstreammost blade stage of the compressor section and has a plurality of vanes having respective inner diameter ends.

In a further embodiment of any of the foregoing embodiments, additionally and/or alternatively, the buffer air supply path passes through a flange of a seal carrier of the carbon seal system and a flange of a forward support of the guide vane stage. The oil drain path passes through the flange of the seal carrier of the carbon seal system and the flange of the forward support of the guide vane stage.

In a further embodiment of any of the foregoing embodiments, additionally and/or alternatively, the one or more second struts are lower on the engine than are the one or more first struts.

In a further embodiment of any of the foregoing embodiments, additionally and/or alternatively, the carbon seal system has a carbon seal mounted to the case and a seal runner or seat on the spool.

In a further embodiment of any of the foregoing embodiments, additionally and/or alternatively, the carbon seal has a seal carrier with an inner diameter section radially inward of the carbon seal. The inner diameter section has a forward portion and an aft portion bearing the plurality of third holes and the one or more fourth holes.

In a further embodiment of any of the foregoing embodiments, additionally and/or alternatively, the compressor section is a higher pressure/speed compressor section and the turbine engine comprises a lower pressure/speed compressor section upstream of the higher pressure/speed compressor section along the gaspath.

In a further embodiment of any of the foregoing embodiments, additionally and/or alternatively, the one or more fourth holes has an off-center average distribution different from an average distribution of the plurality of third holes.

In a further embodiment of any of the foregoing embodiments, additionally and/or alternatively, the plurality of third holes average distribution is higher on the engine than the one or more fourth holes average distribution.

In a further embodiment of any of the foregoing embodiments, additionally and/or alternatively, the one or more fourth holes are within a sector of up to 75°.

In a further embodiment of any of the foregoing embodiments, additionally and/or alternatively, the plurality of third holes are evenly distributed.

In a further embodiment of any of the foregoing embodiments, additionally and/or alternatively, the annular cover further comprises a plurality of knife edge sealing members between the first and second pluralities of holes; and the second plenum is separated from the first plenum by the knife edge seals.

In a further embodiment of any of the foregoing embodiments, additionally and/or alternatively, a method for using the turbine engine comprises: running the engine to drive rotation of the spool; passing air via the buffer air supply path internally through the one or more first struts of the stage of struts and passing through the first plurality of holes, to the first plenum; and passing oil via the oil drain path internally through the one or more second struts of the stage of struts from the first plenum.

In a further embodiment of any of the foregoing embodiments, additionally and/or alternatively, the method further comprises recovering the oil passed through the one or more second struts.

In a further embodiment of any of the foregoing embodiments, additionally and/or alternatively, the buffer air pressurizes the first plenum.

A further aspect of the disclosure involves, a turbine engine comprising: a case; and a gaspath through a compressor section, a combustor, and a turbine section. A spool has blade stages of the compressor section. A guide vane stage extends through the gaspath upstream of an upstream-most blade stage of the compressor section and has a plurality of vanes having respective inner diameter ends. A forward guide vane support and an aft guide vane support have: outer portions cooperating to capture the vane inner diameter ends and flanges inboard of the outer portions and secured to each other by fasteners. A strut stage extends through the gaspath upstream of the guide vane stage. A bearing supports a shaft of the spool for rotation relative to the case and is in a bearing compartment. A carbon seal system seals the bearing compartment and has: a carbon seal mounted to the case; a seal runner on the spool; and a seal carrier carrying the carbon seal and having a flange secured to the flanges of the forward guide vane support and the aft guide vane support.

A buffer air supply path internally through one or more first struts of the stage of struts passes through respective buffer air ports in the seal carrier flange and the forward guide vane support flange. An oil drain path passes through respective oil drain ports in the seal carrier flange and the forward guide vane support flange internally through one or more second struts of the stage of struts.

In a further embodiment of any of the foregoing embodiments, additionally and/or alternatively, the buffer air ports have an average position circumferentially offset from an average position of the oil drain ports.

A further aspect of the disclosure involves a turbine engine comprising: a case; and a gaspath through a compressor section, a combustor, and a turbine section. A spool has blade stages of at least one of the compressor section and the turbine section. A strut stage extends through the gaspath. A bearing supporting a shaft of the spool for rotation relative to the case and is in a bearing compartment. A carbon seal system seals the bearing compartment and has: a carbon seal mounted to the case and a seal runner on the spool; and a seal carrier carrying the carbon seal. The engine has means for passing buffer air along a buffer air supply path internally through one or more first struts of the stage of struts. The engine has means for draining oil along an oil drain path internally through one or more second struts of the stage of struts.

In a further embodiment of any of the foregoing embodiments, additionally and/or alternatively, a guide vane stage extends through the gaspath downstream of the strut stage and upstream of an upstream most blade stage of the compressor section and has a plurality of vanes having respective inner diameter ends.

A further aspect of the disclosure involves a method for using a turbine engine. The turbine engine comprising: a case; and a gaspath through a compressor section, a combustor, and a turbine section. A spool has blade stages of at least one of the compressor section and the turbine section. A bearing supports a shaft of the spool for rotation relative to the case and is in a bearing compartment. A carbon seal system seals the bearing compartment and has a carbon seal mounted to the case and a seal runner on the spool. A strut stage extends through the gaspath. A buffer air flowpath from a bleed port passes through one or more first struts of the strut stage to a first plenum separated from the bearing compartment by the carbon seal system. An oil drain flowpath extends from the first plenum through one or more second struts of the strut stage. The method comprises: running the engine to drive rotation of the spool; passing air via the buffer air flowpath internally through the one or more first struts of the stage of struts to the first plenum; and passing oil via the oil drain flow path internally through the one or more second struts of the stage of struts.

In a further embodiment of any of the foregoing embodiments, additionally and/or alternatively, the oil passed through the one or more second struts is recovered.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
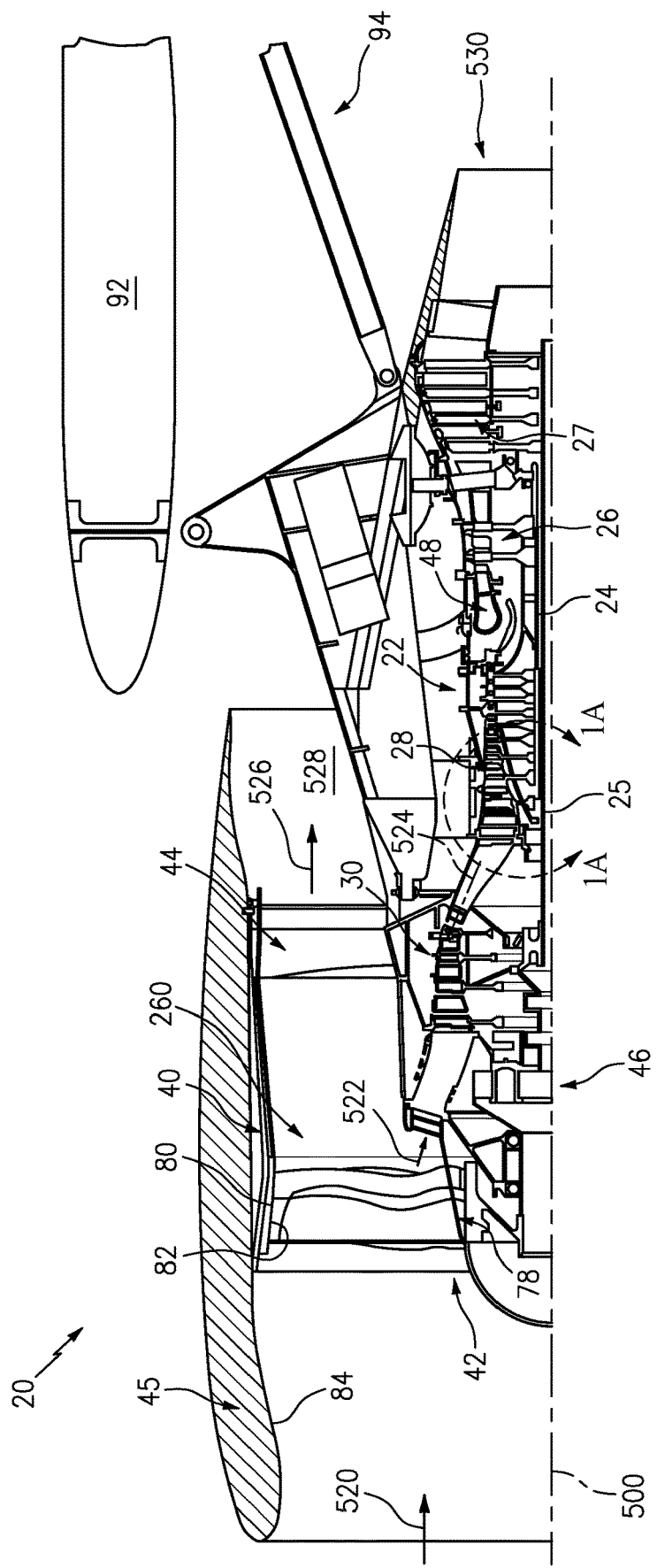
FIG. 1 is a schematized an axial sectional view of a gas turbine engine.

FIG. 1 shows a turbofan engine 20 having a main housing (engine case) 22. An example engine is a geared turbofan. Via a high 24 shaft and a low 25 shaft, a high pressure turbine section (gas generating turbine) 26 and a low pressure turbine section 27 respectively drive a high pressure compressor section 28 and a low pressure compressor section 30. As used herein, the high pressure turbine section experiences higher pressures that the low pressure turbine section. In the turbofan engine, the low pressure turbine section is a section that powers a fan 42. Although a two-spool (plus reduction gear-driven fan) engine is shown, one of many alternative variations involves a three-spool (plus fan) engine wherein an intermediate spool comprises an intermediate pressure compressor between the low fan and high pressure compressor section and an intermediate pressure turbine between the high pressure turbine section and low pressure turbine section.

The engine extends along a longitudinal axis 500 from a fore end to an aft end. Adjacent the fore end, a shroud (fan case) 40 encircles the fan 42 and is supported by vanes 44. An aerodynamic nacelle around the fan case is shown and an aerodynamic nacelle 45 around the engine case is shown.

The low shaft 25 drives the fan 42 through a speed reduction mechanism 46. An example speed reduction mechanism is an epicyclic transmission, namely a star or planetary gear system. As is discussed further below, an inlet airflow 520 entering the nacelle is divided into a portion 522 passing along a core flowpath 524 and a bypass portion 526 passing along a bypass flowpath 528. With the exception of diversions such as cooling air, buffering bleed, etc., flow along the core flowpath sequentially passes through the low pressure compressor section, high pressure compressor section, a combustor 48, the high pressure turbine section, and the low pressure turbine section before exiting from an outlet 530. Each of the example compressor sections and the turbine sections comprises a plurality of stages of blades and a plurality of stages of vanes. The example fan 42 has a single stage of blades. The example engine is shown mounted to a wing 92 of an aircraft via a pylon 94. Alternative engines may be otherwise mounted to aircraft or used in applications such as ship propulsion or stationary power plants (e.g., turboshafts and industrial gas turbines (IGT)).

Figure 1A:
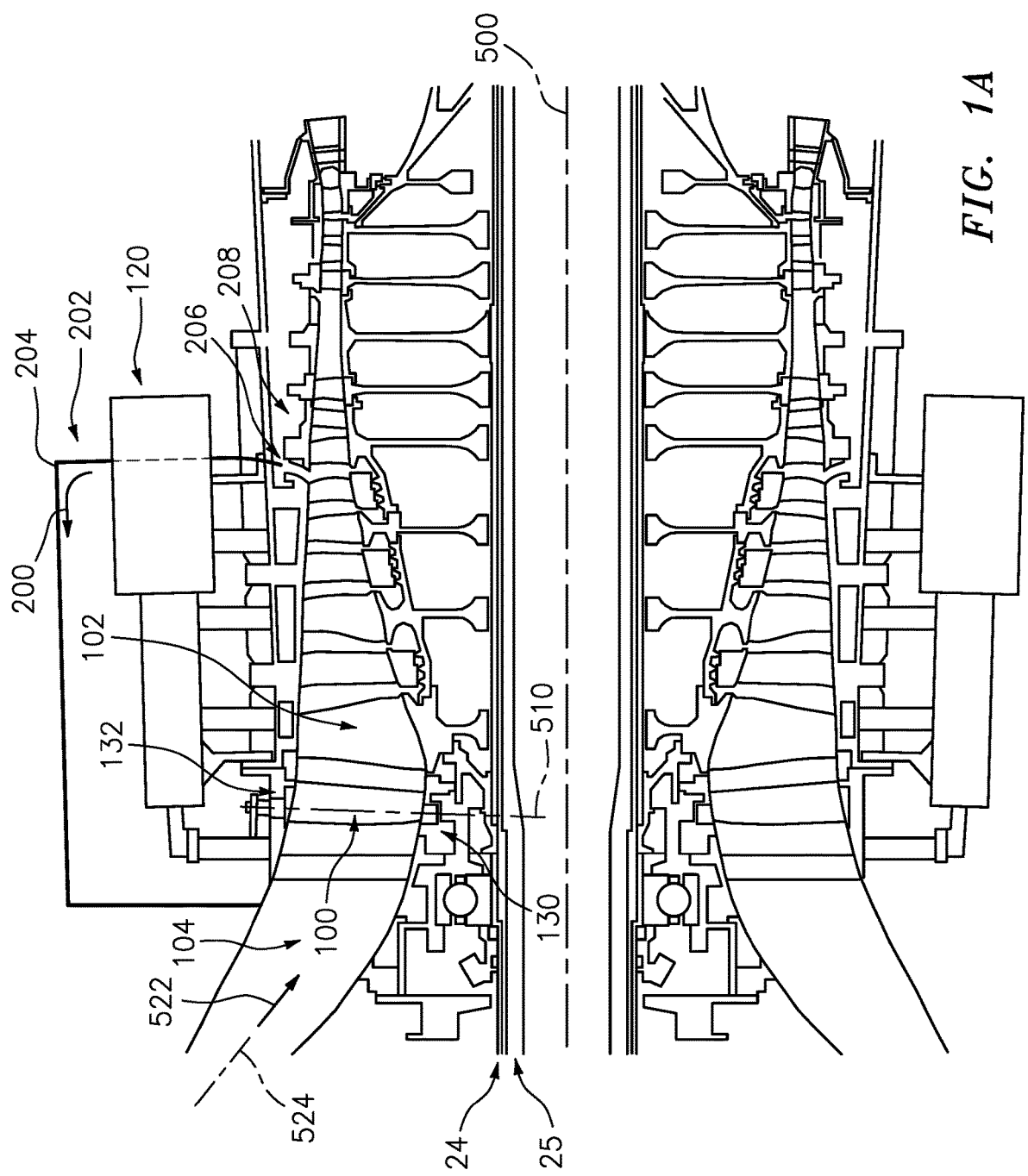
FIG. 1A is an enlarged view of a high pressure compressor section of the engine of FIG. 1.

FIG. 1A shows a circumferential array (stage) of inlet guide vanes (IGV) 100 extending across the core flowpath immediately upstream of the upstream most (first) stage of high pressure compressor (HPC) blades 102. The IGV stage is immediately downstream of a stage of struts 104. The example IGV 100 are rotary vanes mounted for rotation about respective axes 510 via an actuator mechanism (actuator) 120. The example actuator 120 uses synchronizing rings to synchronize vane rotation. The example actuator 120 actuates not merely the IGV stage but also additional vane stages (three additional actuated rotary vane stages shown) between subsequent blade stages (the example embodiment further shows fixed vane stages downstream of the rotary stages).

In an example embodiments, the actuator 120 is multiple actuators (e.g., hydraulic or pneumatic) circumferential disposed about the engine axis 500.

Figure 3:
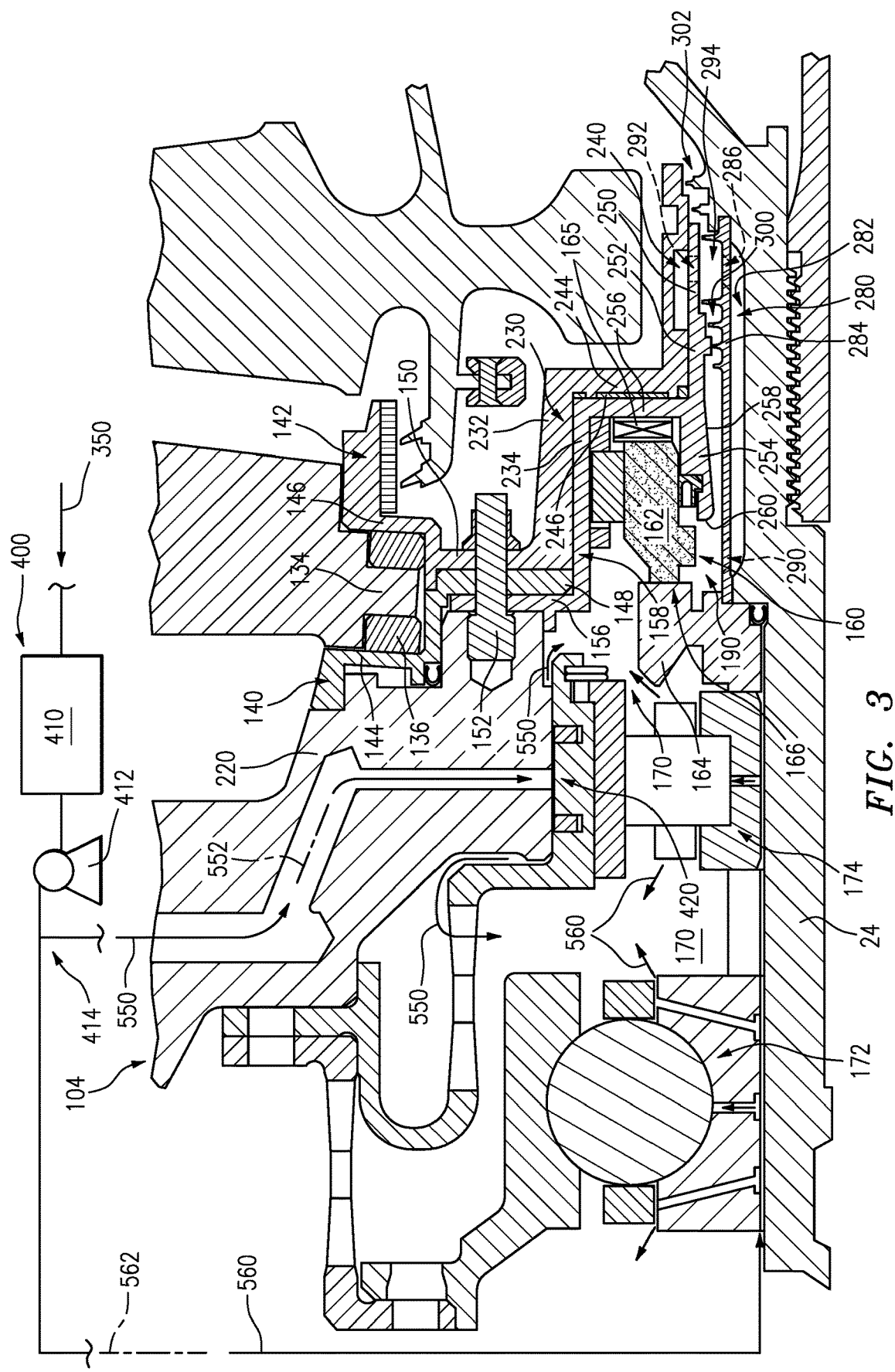
FIG. 3 is an enlarged axial sectional view of the engine away from the air supply and oil drain.

Each example vane has an airfoil extending across the core flowpath 524. Each vane is supported at ID and OD by respective bearing systems 130, 132. The example bearing systems may include shafts unitary formed with the airfoil received in journals carried by the case. FIG. 3 shows the ID shaft 134 captured in a journal (bushing) 136. The journals are held by a bearing support assembly (IGV support) comprising a forward support (shroud) 140 and an aft support (shroud) 142. The forward support 140 and aft support 142 may be full annulus or may be segmented annulus secured to each other. In the example embodiment, they are full annulus. The supports 140, 142 have an outboard portion 144, 146 combining to form a pocket holding the journal 136. Inboard of the outboard portions 144, 146, the forward and aft supports have flanges or webs 148, 150 secured to each other via a circumferentially distributed plurality of fasteners 152 (e.g., threaded fasteners such as nutted bolts or nutted screws). The example threaded fasteners pass through corresponding holes in the flanges 148 and 150. As is discussed further below, the fasteners further pass through holes in a flange 156 of a seal carrier (seal support or seal housing) 158. In the example embodiment, the flanges are sandwiched from fore to aft: 156; 148; 150. The example seal carrier 158 carries the carbon seal 162 of a carbon seal system 160 which further includes a seal runner 164 (e.g., alloy such as a steel). A spring 165 biases a forward face (e.g., an annular face) of the carbon seal 162 into sealing engagement with an aft face (e.g., an annular face) of the seal runner 164 to form a seal interface 166 at the relatively rubbing surfaces. The carbon seal system seals a bearing compartment 170. The example bearing compartment contains two bearing systems 172 and 174 supporting the high pressure shaft relative to the case (e.g., directly rather than via another spool in this example). Both bearing systems 172 and 174 are rolling-element bearings with the bearing 172 being a ball-type thrust bearing forward of a cylindrical roller bearing 174. The bearing compartment contains oil introduced via a lubrication system 400.

FIG. 3 schematically shows the lubrication system 400 as including a reservoir 410 and a pump 412. These are connected via a branching supply line network 414 delivering lubricant (oil) flows along various flowpaths. Additional features such as valves, sensors, and the like are not shown. The exemplary oil flows include a branching bearing lubrication flow 560 along a branching bearing lubrication flowpath 562 and a branching damper flow 550 along a branching damper flowpath 552. The damper flowpath(s) extend to one or more squeeze film dampers 420. The exemplary squeeze film dampers are shown damping the radial bearing 174. Additional oil flows/flowpaths (not shown) may include seal cooling and/or lubrication flowpaths that introduce oil to cool the seal runner/seat 164 and/or cool/lubricate the sealing interface 166 (e.g., "dry face seals" and "wet face seals" as known in the art). In the illustrated example, the bearing lubrication flows 560 and leakage of the squeeze film damper flows 550 enter the bearing compartment 170. The length advantage may be particularly relevant relative to systems that introduce the buffer air through the shaft. Such systems may have excess length associated with the introduction of the air and the oil collection. For example, the air ports in the shaft would need a dedicated region of the shaft clear of other features such as intrashaft connections. Although shown schematically, the flowpath 560 may pass through one or more struts of the strut stage 104.

Although shown in the context of weepage from a bearing compartment supporting the high spool relative to the case between the HPC and LPC, the principles may be applied in different positioning. For example, as in U.S. Pat. No. 7,967,560 noted above, positioning may be proximate the turbine sections. For example, if positioned at the rear end of the LPT, the buffer air and oil could pass through a strut stage downstream of the associated section (e.g., a strut stage immediately downstream of the LPT servicing the rearmost bearing compartment of the low spool). For further example, if positioned between the HPT and LPT, the buffer air and oil could pass through a strut stage downstream of the associated section (e.g., a strut stage immediately downstream of the HPT servicing the rearmost bearing compartment of the high spool).

In operation, some of the oil in the bearing compartment 170 may leak past the sealing system 160. Due to mechanical agitation of running the engine, the bearing compartment will typically contain droplets of oil in air. There may, however, be a liquid oil or foamy oil accumulation 176 (FIG. 5A) at the bottom of the bearing compartment (e.g., bottom being near the 6 o'clock circumferential position).

Figure 2:
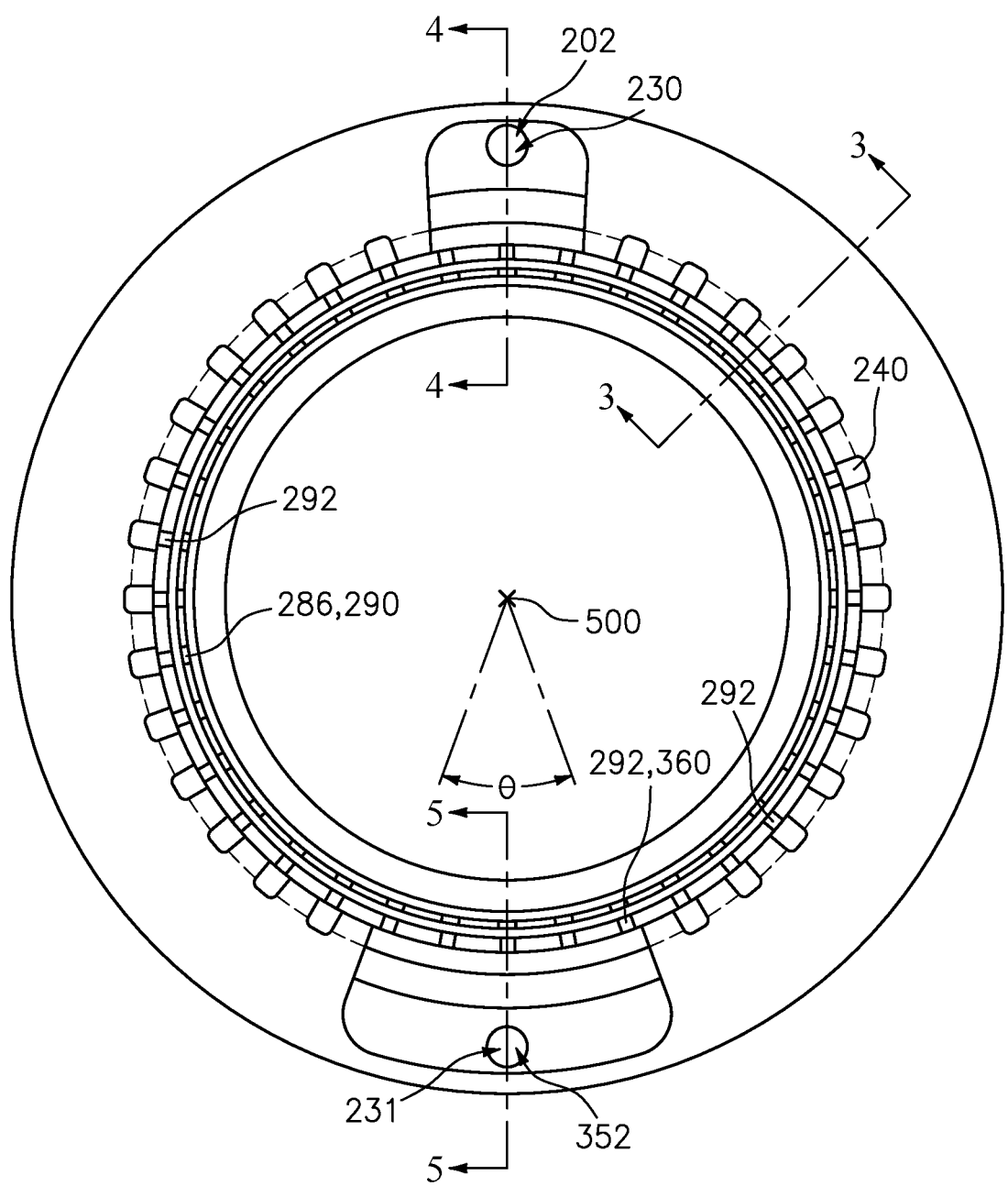
FIG. 2 is a schematized partial transverse sectional view of the engine of FIG. 1 notionally showing positions of various ports/holes.
Figure 4:
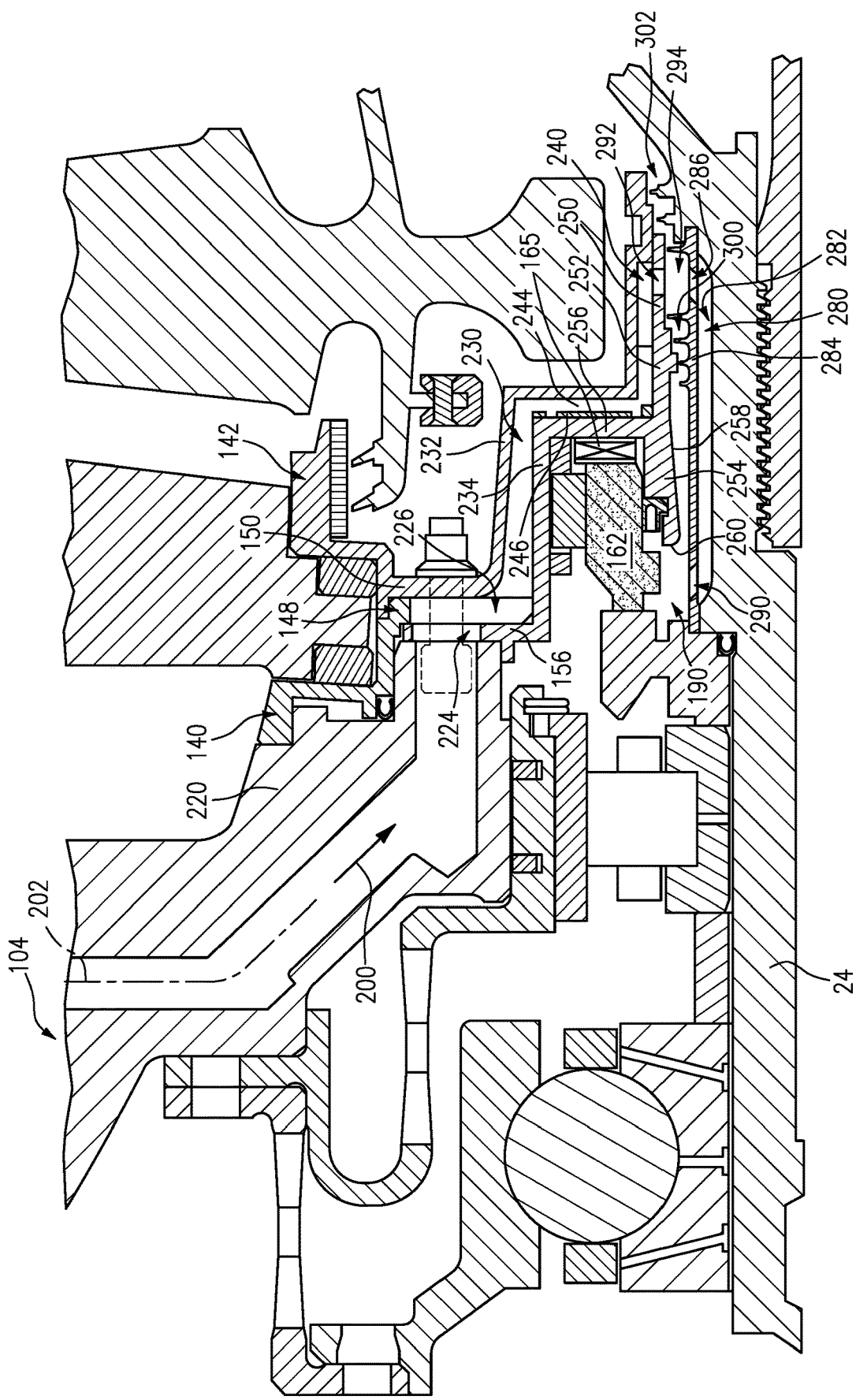
FIG. 4 is an enlarged axial sectional view of the engine through the air supply.
Figure 4A:
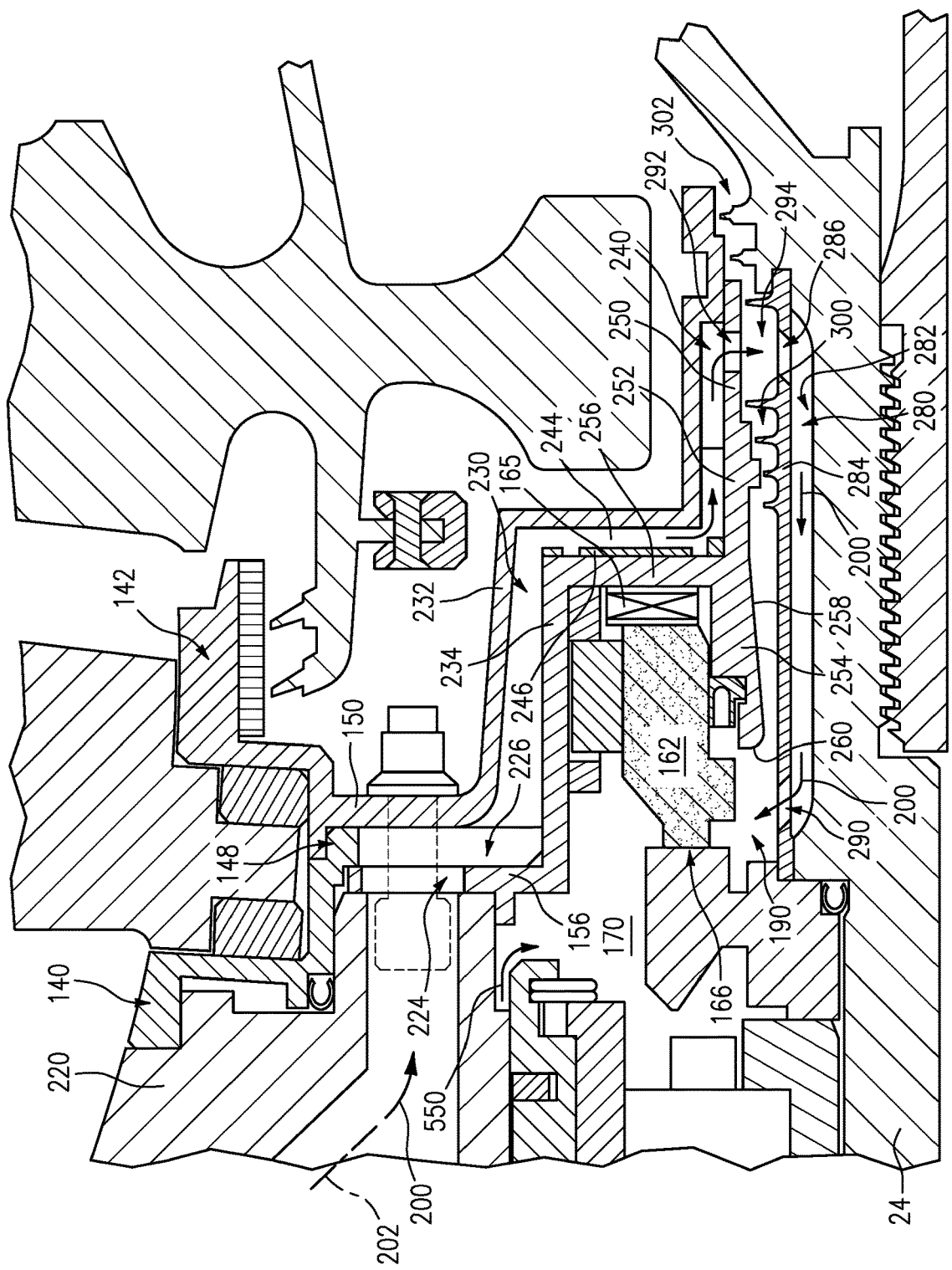
FIG. 4A is an enlarged detail view of FIG. 4.

To partially counter infiltration of oil past the carbon seal system 160, a region (chamber) 190 (FIG. 4A) opposite the seal interface 166 from the bearing compartment 170 is used as a buffering plenum into which pressurized air is introduced. In the illustrated embodiment, the buffering plenum is locally to the ID of the sealing system at the sealing interface. The buffering plenum 190 receives a bleed air flow 200 (FIG. 1A) passing along a bleed flowpath 202 initially passed by a bleed line 204. The bleed air may be bled from the high pressure compressor at one of the downstream stages (e.g., bleed port 206 to a bleed plenum 208). The bleed flowpath 202 may pass through a heat exchanger (not shown) that allows the bleed air flow to reject heat to the bypass flow in the bypass flowpath 528 (FIG. 1) or other cooler flow. As is discussed further below, the bleed flowpath 202 extends radially inward through one or more of the struts 104 (FIG. 4). For purposes of illustration, FIGS. 2 and 4 show the bleed flow 200 passing through a single strut 104 at approximately a twelve o'clock position when viewed axially rearward.

The bleed flowpath 202 passes radially inward through an inner ring or hub portion 220 of the strut stage structure. The inner ring 220 may be shared by a full annular strut array (stage) or by a segment of several struts in the stage wherein multiple such segments are assembled circumferentially. The bleed flowpath then passes through ports 224 and 226 in the flanges 156, 148 of the seal carrier 158 and the forward shroud 140. The bleed flowpath 202 then progresses to a bleed passageway leg 230 between a section 232 of the aft support 142 and a section 234 of the seal carrier 158. The leg 230 forms a bleed/buffer supply trunk with an aft and inboard end of the chamber 230 feeding a circumferentially-extending plenum 240.

The bleed passageway leg 230 may be a laterally (circumferentially) bounded by standoffs 244 formed on one or both of the aft support 142 and seal carrier to maintain their spacing. The standoffs may extend the full length of the passageway leg 230 or they may be separated by gaps filled/blocked with gasket material 246. The leg 230 may occupy a small annular span (e.g., up to an example 30° (e.g., 2.0° to 30° or 5.0° to 20°).

The plenum 240 is formed along the OD side of an aft portion 250 of an inner diameter (ID) section 252 of the seal carrier. An example circumferential extent of the plenum 240 is in at least 90° (e.g., 90° to 360°) A forward portion 254 of the ID section 252 is (radially) inboard of the carbon seal 162. A web 256 extends radially outward at the junction of the forward portion 254 and the aft portion 250.

The seal carrier ID section 252 (FIG. 4A) has an inner diameter (ID) surface 258 and extends to a forward rim 260. In operation, bleed air passes to the buffering plenum 190 through an annular shaft plenum 280 formed between a radially outwardly open annular channel 282 in the high shaft 24 and an annular cover 284 carried by the high shaft. The cover 284 has aft inlet ports (inlets) 286 and forward outlet ports (outlets) 290. An example cover is a full annulus alloy (e.g., nickel-based superalloy) piece manufactured by turning and hole drilling.

To reach the inlets 286, bleed air passes from the chamber 230 into the plenum 240 and through holes or ports 292 in the aft portion 250 of the seal carrier 158 to enter a plenum 294 radially between the seal carrier ID section 252 and the cover 284. The inlets (inlet ports) 286 to the shaft plenum 280 are outlets from the plenum 294.

Respective fore and aft knife-edge sealing systems 300 and 302 seal the plenum 294 fore and aft, allowing the buffer flow 200 to principally pass from the ports 292 to the ports 286 to the ports 290 to internally pressurize the buffer chamber 190.

Figure 5:
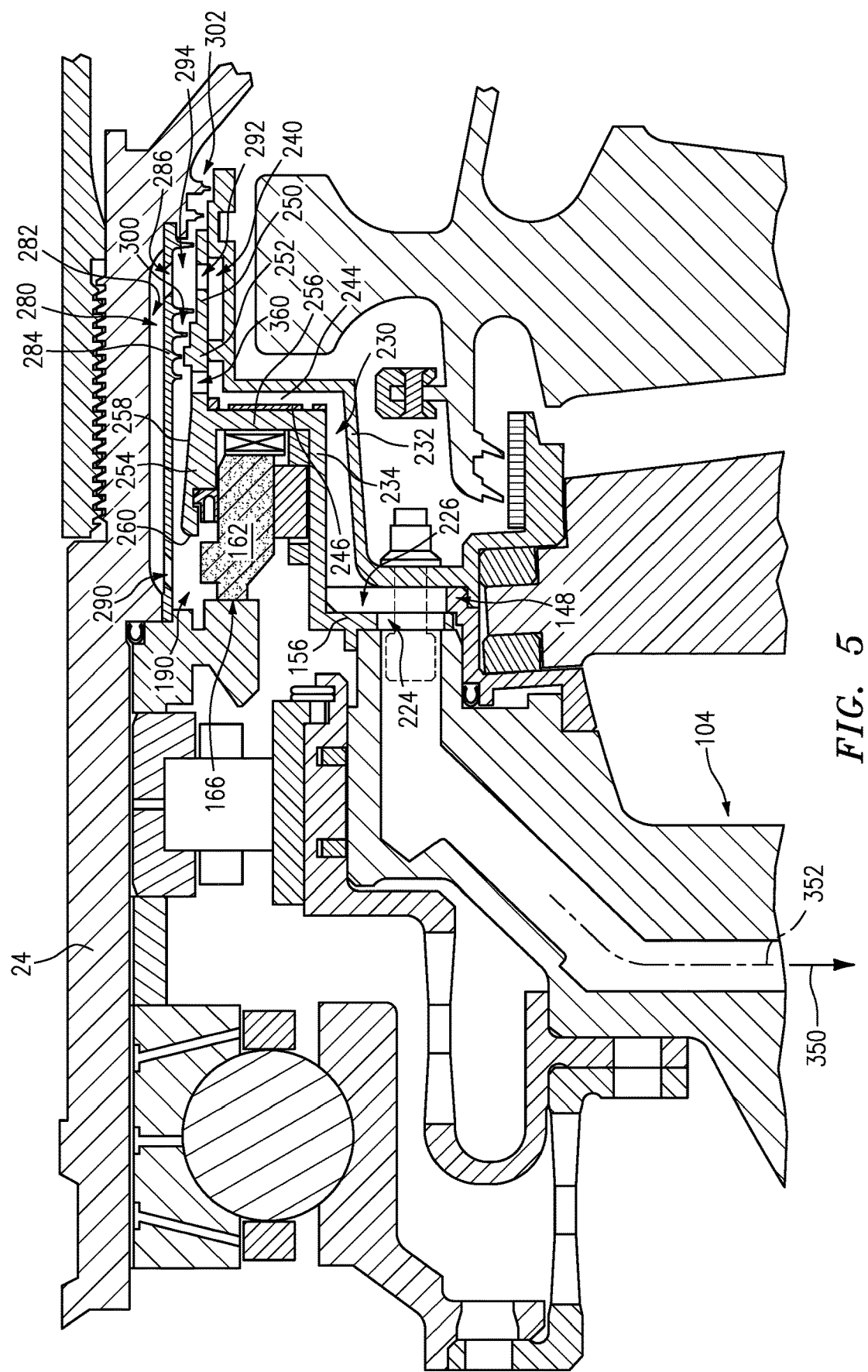
FIG. 5 is an enlarged axial sectional view of the engine through the oil drain.

Similarly, the drain flowpath may pass through another one or more of the struts 104. FIG. 5 shows a drain flow 350 in a strut 104 at or near the six o'clock position. Thus, the strut(s) passing the drain flow is relatively lower on the engine than the strut(s) passing the bleed flow. Similar to the bleed flowpath 202, the drain flowpath 352 includes sections through the strut and the flanges 148, 156 of the forward support 140 and seal carrier 158. However, the drain flow and drain flowpath may pass through different ports 360 in the seal carrier aft portion 250 (different from the ports 292 of FIG. 4A). The ports 360 may be relatively forward of the ports 292 generally axially opposite the labyrinth sealing system 300. In operation, oil 354 (FIG. 5A) will accumulate relatively low in the buffer chamber 190 having leaked from the bearing compartment through the seal interface 166. A combination of gravity and pressurization from the buffer flow 200 and centrifugal action of the shaft rotation may sling oil radially outward. The inner diameter surface 362 along the seal carrier ID section forward portion 254 may diverge radially outward from fore to aft to facilitate the flow of oil downward and aftward along that surface 362 as the oil is circumferentially flung from the shaft and hits that surface. This helps guide the oil drain flow 350 to the port(s) 360 to pass radially outward and downward in this location. The drain flow 350 passes through a drain passageway leg or trunk 231 circumferentially offset from the bleed passageway leg or trunk 230. The passageway legs 230 and 231 are isolated from communication with each other due to circumferential segmentation discussed above and an aft end of the drain passageway leg 231 being closed forward of the plenum 240. The drain flow 350 may pass back to an oil reservoir (not shown).

In terms of circumferential distribution, ports 286 and 290 on the rotor may be distributed at a uniform circumferential interval. The ports 292 may be similarly at a uniform circumferential interval. The ports 360 may be highly localized. For example, the ports 360 may be distributed only along a plenum feeding the passageway leg 231. They may be concentrated along a sector of an angle θ (FIG. 2) of up to about 75° (more particularly an example up to 60°). There is enough breadth to provide sufficient drainage flow cross-sectional area for the planned operational conditions. For example, a low end on breadth might be merely 1° and might be the diameter of a single hole. Further increases in breadth above 10° accommodates departures from nominal orientation. For example, engine orientation may vary based upon the loading on an aircraft's wings and aircraft turning may cause the aircraft y-axis to depart from vertical, etc. The drain sector occupied by the port(s) 360 will typically span the six o'clock position. Although the port(s) 360 are shown as one or more circular holes, a circumferentially elongate slot could replace multiple circular holes. FIG. 2 schematically shows distribution of the various ports 286, 290, 292, and 360. For purposes of illustration the ports 360 (limited to the sector of angle θ) are shown immediately in front of respective ports 292 (whose array continues beyond the sector) and of equal diameter thereto. However, the ports 360 may be of different size and may be circumferentially offset from the ports 292. FIG. 2 also shows the plenum 240 partially segmented by structural standoffs.

Figure 5A:
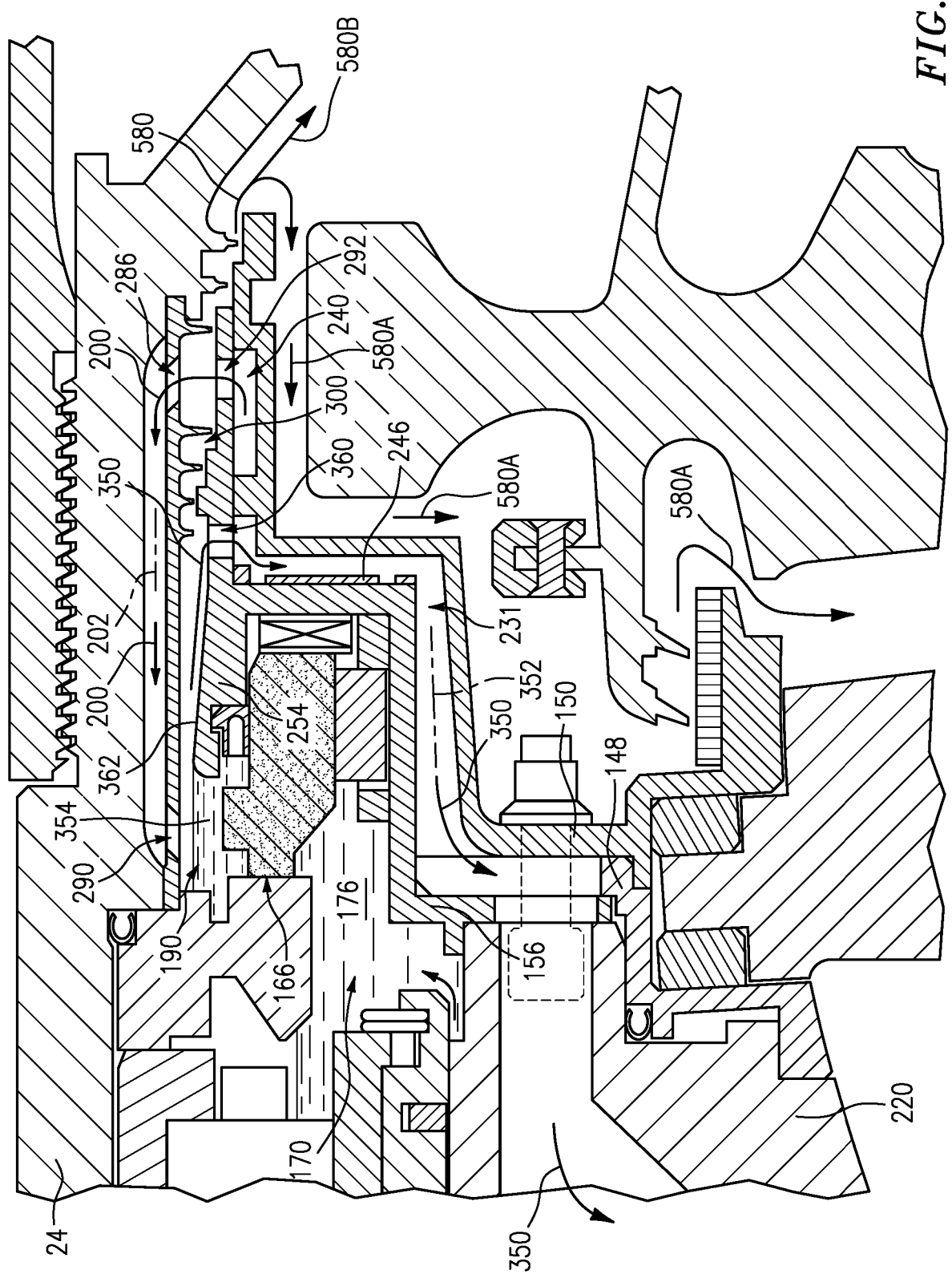
FIG. 5A is an enlarged detail view of FIG. 5.

Various implementations may have one or more of various advantages. For example, oil contamination of the gaspath may be reduced because weepage oil is removed before encountering the HPC first stage disk and potentially leaking back into the gaspath and contaminating bleed air. Also, oil accumulation in the high spool rotor may be reduced. FIG. 5A shows a leakage flow 580 branching into a portion 580A that reenters the core flowpath upstream of the HPC first stage disk and a portion 580B that may become trapped in the high spool rotor. The buffering action of the air 200 may help reduce the volume of this flow 580 that passes through the seal 300.

Axial compactness may be achieved because buffer supply and weepage drain are consolidated into a single stage of struts (and/or vanes) and are circumferentially spaced while mostly axially overlapping (e.g., by at least 50% of the axial length of the longer of the two within the ID of the gaspath) rather than being axially spaced apart. Thus, the buffer flowpath and drain flowpath and their respective sections may be largely defined by the same components and features thereof (e.g. axially extending portions, radially extending portions and the like), just at different circumferential locations. The exemplary bearing lubrication flows and squeeze film damper flows may pass through yet different struts in the same strut stage than do the buffer flows and drain flows.

Thus, four different struts or four different (e.g., non-overlapping) groups of struts may handle the bearing, damper, buffer and drain flows.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline engine configuration, details of such baseline may influence details of particular implementations. Accordingly, other embodiments are within the scope of the following claims.

What is claimed is:

1. A turbine engine comprising:
   a case;
   a gaspath through a compressor section, a combustor, and a turbine section;
   a spool having blade stages of at least one of the compressor section and the turbine section;
   a stage of struts extending through the gaspath;
   a bearing supporting a shaft of the spool for rotation relative to the case and in a bearing compartment;
   a carbon seal system sealing the bearing compartment and having:
      a carbon seal mounted to the case and a seal runner on the spool;
   a shaft plenum;
   a first plenum, the carbon seal system separating the bearing compartment from the first plenum;
   a second plenum;
   a third plenum;
   a buffer air supply path internally through one or more first struts of the stage of struts and passing through the third plenum, the second plenum, and the shaft plenum, to the first plenum; and
   an oil drain path internally through one or more second struts of the stage of struts from the first plenum,
   wherein:
      the carbon seal has a seal carrier with an inner diameter section radially inward of the carbon seal; and
      the inner diameter section has a forward portion along the first plenum and an aft portion separating the second plenum from the third plenum.

2. The turbine engine of claim 1 further comprising:
   a guide vane stage extending through the gaspath downstream of the stage of struts and upstream of an upstream most blade stage of the compressor section and having:
      a plurality of vanes having respective inner diameter ends.

3. The turbine engine of claim 2 wherein:
   the buffer air supply path passes through a flange of the seal carrier of the carbon seal system and a flange of a forward support of the guide vane stage; and
   the oil drain path passes through the flange of the seal carrier of the carbon seal system and the flange of the forward support of the guide vane stage.

4. The turbine engine of claim 1 wherein:
   the one or more second struts are lower on the engine than are the one or more first struts.

5. The turbine engine of claim 1 wherein:
   the compressor section is a higher pressure/speed compressor section; and
   the turbine engine comprises a lower pressure/speed compressor section upstream of the higher pressure/speed compressor section along the gaspath.

6. The turbine engine of claim 1 wherein:
   the second plenum is separated from the first plenum by knife edge seals.

7. A method for using the turbine engine of claim 1, the method comprising:
   running the engine to drive rotation of the spool;
   passing air via the buffer air supply path internally through the one or more first struts of the stage of struts to the first plenum to pressurize the first plenum; and
   passing oil via the oil drain path internally through the one or more second struts of the stage of struts from the first plenum.

8. The method of claim 7 further comprising:
   recovering the oil passed through the one or more second struts.

9. A turbine engine comprising:
   a case;
   a gaspath through a compressor section, a combustor, and a turbine section;
   a spool having blade stages of at least one of the compressor section and the turbine section;
   a stage of struts extending through the gaspath;
   a bearing supporting a shaft of the spool for rotation relative to the case and in a bearing compartment;
   a carbon seal system sealing the bearing compartment and having:
      a carbon seal mounted to the case and a seal runner on the spool; and
      a seal carrier carrying the carbon seal;
   means for passing buffer air along a buffer air supply path internally through one or more first struts of the stage of struts, wherein the buffer air supply path passes through a plurality of inlet ports in the spool and a plurality of outlet ports in the spool; and
   means for draining oil along an oil drain path internally through one or more second struts of the stage of struts.

10. The turbine engine of claim 9 further comprising:
    a guide vane stage extending through the gaspath downstream of the stage of struts and upstream of an upstream most blade stage of the compressor section and having:
       a plurality of vanes having respective inner diameter ends.

11. The turbine engine of claim 9 wherein:
    the means for passing buffer air is means for passing buffer air along the buffer air supply path internally through the one or more first struts of the stage of struts to partially counter infiltration of oil past the carbon seal system.

12. The turbine engine of claim 9 wherein:
    the means for passing buffer air is means for passing buffer air along the buffer air supply path internally through the one or more first struts of the stage of struts to a region opposite a seal interface of the carbon seal system from the bearing compartment.

13. A method for using a turbine engine, the turbine engine comprising:
- a case;
- a gaspath through a compressor section, a combustor, and a turbine section;
- a spool having blade stages of at least one of the compressor section and the turbine section;
- a bearing supporting a shaft of the spool for rotation relative to the case and in a bearing compartment;
- a carbon seal system sealing the bearing compartment and having:
  - a carbon seal mounted to the case and a seal runner on the spool;
- a stage of struts extending through the gaspath;
- a buffer air flowpath from a bleed port and passing through one or more first struts of the stage of struts and through a shaft plenum of said spool, the shaft plenum bounded by the spool at inner diameter and outer diameter to a first plenum separated from the bearing compartment by the carbon seal system; and
- an oil drain flowpath extending through one or more second struts of the stage of struts, the method comprising:
- running the engine to drive rotation of the spool;
- passing air via the buffer air flowpath internally through the one or more first struts of the stage of struts to the first plenum through the shaft plenum; and
- passing oil via the oil drain flow path internally through the one or more second struts of the stage of struts.

14. The method of claim 13 further comprising:
recovering the oil passed through the one or more second struts.

15. The method of claim 13 wherein:
the passing air via the buffer air flowpath internally through the one or more first struts of the stage of struts partially counters infiltration of oil past the carbon seal system.

16. The method of claim 15 wherein:
the passing air via the buffer air flowpath internally through the one or more first struts of the stage of struts is to a region opposite a seal interface of the carbon seal system from the bearing compartment.

17. The method of claim 13 wherein:
the passing air via the buffer air flowpath internally through the one or more first struts of the stage of struts is to a region opposite a seal interface of the carbon seal system from the bearing compartment.

18. A turbine engine comprising:
- a case;
- a gaspath through a compressor section, a combustor, and a turbine section;
- a spool having blade stages of at least one of the compressor section and the turbine section;
- a stage of struts extending through the gaspath;
- a bearing supporting a shaft of the spool for rotation relative to the case and in a bearing compartment;
- a carbon seal system sealing the bearing compartment and having:
  - a carbon seal mounted to the case and a seal runner on the spool;
- a shaft plenum;
- a first plenum, the carbon seal system separating the bearing compartment from the first plenum;
- a second plenum;
- a third plenum;
- a buffer air supply path internally through one or more first struts of the stage of struts and passing through the third plenum, the second plenum, and the shaft plenum, to the first plenum;
- an oil drain path internally through one or more second struts of the stage of struts from the first plenum; and
- a guide vane stage extending through the gaspath downstream of the stage of struts and upstream of an upstream most blade stage of the compressor section and having:
  - a plurality of vanes having respective inner diameter ends, wherein:
- the buffer air supply path passes through a flange of a seal carrier of the carbon seal system and a flange of a forward support of the guide vane stage; and
- the oil drain path passes through the flange of the seal carrier of the carbon seal system and the flange of the forward support of the guide vane stage.

19. The turbine engine of claim 18 wherein:
the second plenum is separated from the first plenum by knife edge seals.

20. The turbine engine of claim 18 wherein:
the one or more second struts are lower on the engine than are the one or more first struts.

21. The turbine engine of claim 18 wherein:
the compressor section is a higher pressure/speed compressor section; and
the turbine engine comprises a lower pressure/speed compressor section upstream of the higher pressure/speed compressor section along the gaspath.

* * * * *